3,410,896
PROCESS FOR THE PREPARATION
OF PHENYLALANINE

Masao Tanaka, Machida-shi, Teruo Kishi, Tokyo, and Yo Kato, Machida-shi, Japan, assignors to Kyowa Hakko Kogyo Co., Ltd., Tokyo, Japan, a corporation of Japan
No Drawing. Filed Apr. 20, 1965, Ser. No. 449,643
Claims priority, application Japan, Apr. 21, 1964, 39/22,148
15 Claims. (Cl. 260—518)

---

ABSTRACT OF THE DISCLOSURE

A process for the preparation of phenylalanine and N-acyl and ester derivatives thereof which comprises catalytically hydrogenating an O-arylsulfonic, O-alkylsulfonic or O-sulfuric acid ester of tyrosine. The process is especially useful for preparing optically active phenylalanine compounds such as L-phenylalanine directly from an optically active tyrosine compound.

---

This invention relates to a process for the preparation of phenylalanine. More particularly, it relates to a process for the preparation of optically active phenylalanine from optically active tyrosine. Even more particularly, the invention especially relates to a process for the preparation of optically active L-phenylalanine from L-tyrosine or a derivative thereof by the hydrogenation of certain of its O-esters. Still more particularly, the present invention especially relates to a process for the preparation of optically active L-phenylalanine from L-tyrosine or a derivative thereof by the hydrogenation of certain of its O-sulfonic acid or O-sulfuric acid esters.

Phenylalanine, α-amino-β-phenylpropionic acid, is a well known compound. It is one of the important essential amino acids. As is well known in the art, the levo form of this acid is more important than the dextro form in many ways. For example, the dextro optical isomer of this amino acid is utilized only to a very small extent by the human organism and cannot be completely substituted for the levo form nutritionally. Thus, the levo form is more valuable medically than the dextro form. Because of its great utility, the production of pure L-phenylalanine by a simple procedure and at low cost is a problem of extreme importance. However, this problem has not been satisfactorily solved in the prior art. It is difficult to separate phenylalanine from natural substances because the content of this amino acid in natural proteins is comparatively low. Therefore, synthetic methods have been employed in an attempt to obtain large amounts of the product effectively.

It is known in the prior art to synthesize phenylalanine by the Azulactone method from glycine and benzaldehyde [Okuda and Fujii, Bulletin of the Chemical Society of Japan, volume 30, page 698 (1957)], by an oxidation-reduction method from α-hydroxyiminobenzyl acetone [Mori, Journal of the Chemical Society of Japan, volume 79, 1239 (1958)] and other similar procedures. However, with these prior art methods, it is necessary to separate the levo form of the isomer from the product by tedious methods in order to obtain a product effective for use as a medicine because the phenylalanine obtained by these procedures is the racemic compound. Accordingly, the above-mentioned methods are not completely satisfactory industrially for producing a desired optically active product in an efficient and low-cost manner.

One of the objects of the present invention is to provide a process for the preparation of optically active phenylalanine which overcomes the disadvantages and deficiencies of the prior art methods.

Another object of the present invention is to provide a process for the preparation of optically active phenylalanine which may be carried out in an efficacious manner.

A further object of the invention is to provide a process for the preparation of optically active phenylalanine, especially L-phenylalanine, which may be carried out easily and simply to give a product of high purity in good yield.

A still further object of the invention is to provide a process for the preparation of L-phenylalanine which may be carried out at low cost.

These and other objects of the present invention will become apparent to those skilled in the art from a reading of the following specification and claims.

In accordance with the present invention, it has been found that L-phenylalanine may be obtained easily, economically and in high purity and yield from L-tyrosine. The method is effected by reducing and removing the phenol hydroxyl group from L-tyrosine without losing the optical activity thereof. The starting material, L-tyrosine, which can also be designated as L-p-hydroxyphenylalanine, itself has low activity as an essential amino acid and cannot be completely substituted for L-phenylalanine nutritionally. Furthermore, L-tyrosine is undesirable for use as a medicine because of its low solubility. However, by the method of the present invention, L-tyrosine, of limited utility, can be converted readily into L-phenylalanine, a compound of great utility.

The phenol hydroxyl group of L-tyrosine cannot be reduced by ordinary reduction methods, and specific methods must be employed in order to convert the phenol moiety of the molecule into a phenyl moiety. Heretofore, methods for removing such a phenol hydroxyl group involved a catalytic hydrogenolysis of the aryl or alkylsulfonic acid ester, such as the p-toluene-sulfonic acid ester (tosylate), methanesulfonic acid ester, ethanesulfonic acid ester, etc., or the sulfuric acid ester, of the compound [Mitsui and Imaizumi, Journal of the Chemical Society of Japan, volume 79, 1436, 1442 (1958)].

However, such methods have not been applied to molecules containing an amino radical. Specifically, studies of the application of such a procedure to α-amino acids have not been reported in the literature.

In accordance with the process of the present invention, L-phenylalanine may be produced extremely readily and in high yield by removing the hydroxyl group of L-tyrosine, as mentioned hereinbelow, by utilizing hydrogenolysis of the sulfonic or sulfuric acid esters of L-tyrosine and its derivatives. The fact that hydrogenolysis of sulfonic acid esters may be utilized with tyrosine or its derivatives is not only novel but also valuable, as pointed out hereinabove. Therefore, the method of producing L-phenylalanine from L-tyrosine by the process of the present invention not only is novel but also affords a low-cost process giving excellent results.

It should be noted that the process of the present invention may be applied not only to L-tyrosine but also to D-tyrosine and DL-tyrosine. The optical activity of the starting material is retained throughout the process of the present invention; hence, the optical isomer corresponding to the starting compound is obtained, as mentioned hereinbelow.

In the method of the present invention, phenylalanine or its derivatives are obtained easily by the catalytic hydrogenation of the O-sulfonic or O-sulfuric acid esters of tyrosine or its derivatives, at room temperature and atmospheric pressure. Under the conditions of the present invention mentioned herein, phenylalanine or its derivatives are obtained in a high yield and in a short period of time. The crystals of phenylalanine or its derivatives are obtained in high purity by filtering off the catalyst, removing any by-product sulfonic or sulfuric acid and the solvent and recrystallizing the crude crystals from water or aqueous alcohol. The obtained product has the same optical activity as that of the starting material because the reaction and the after-treatment do not affect the optical activity. Accordingly, the process of the present invention provides an extremely easy and economical method of producing phenylalanine or its derivatives having a desired optical activity, for example, L-phenylalanine.

As the starting material for the hydrogenolysis, O-alkylsulfonic acid esters, O-arylsulfonic acid esters or O-sulfuric acid esters of tyrosine or its derivatives having no substituted radical in the phenolic hydroxyl group may be employed in the present invention. Utilizable tyrosine derivatives include the N-acyl compounds, such as N-acetyl-, N-benzoyl-, N-tosyl-derivatives, etc., tyrosine compounds wherein the α-carboxyl radical has been converted into an ester radical such as methyl, ethyl, propyl, benzyl, etc., or the latter esters of the N-acyl derivatives of tyrosine which have been further substituted in either or both of these positions, etc. Thus, for example, the O-tosylate, O-methanesulfonate, O-ethanesulfonate or O-sulfuric acid ester of tyrosine, N-tosyltyrosine, N-acetyltyrosine, N-benzoyltyrosine, N-carbobenzoxytyrosine, N-carboethoxytyrosine, and the methyl, ethyl or benzyl ester of any of these may be employed as the starting material in the hydrogenolysis according to the process of the present invention.

The sulfonic or sulfuric acid esters of tyrosine or its derivatives are obtained by a known conventional method. As the alkyl or aryl sulfonic acid employed in converting the phenolic hydroxyl group of tyrosine or its derivatives into an ester group, methanesulfonic acid, ethanesulfonic acid, p-toluenesulfonic acid and the like may be mentioned by way of example.

For example, O-tosylate is obtained by the reaction of tyrosine or its derivatives with p-toluenesulfonyl chloride; the O-methanesulfonate and O-ethanesulfonate are obtained by the reaction of tyrosine or its derivatives with methanesulfonyl chloride or ethanesulfonyl chloride, respectively. The sulfonic acid esters may be easily obtained as the salts by reacting salts of tyrosine or its derivatives with a pyrosulfuric acid salt or a sulfonic acid salt under heat. For example, O-tosyltyrosine is easily obtained by reacting p-toluenesulfonyl chloride with copper tyrosine in an aqueous alkali solution; O,N-ditosyltyrosine by the reaction of p-toluenesulfonyl chloride with tyrosine directly; and the O-methanesulfonate of N-acetyltyrosine by reacting methanesulfonyl chloride with N-acetyltyrosine.

The preferred starting compound in the process of the present invention is O-tosyltyrosine or O,N-ditosyltyrosine from the point of view of ease of treatment of the esterifying agent or the product ester and the esterifying reaction itself, and the after-treatment procedure. While the radicals substituted on the α-amine group and on the α-carboxyl group of tyrosine or its derivatives have little effect on the hydrogenolysis, the O-substituted radical, i.e., the type of sulfonic or sulfuric acid ester of phenolic hydroxy group of tyrosine or its derivatives affects the hydrogenolysis. For example, the reaction velocity shows a tendency to decrease in the order of O-tosylate, O-methanesulfonate or ethanesulfonate, and O-sulfate, respectively. Hence, from this point of view, the O-tosyl compounds are the most advantageous as the starting material.

As solvents to be utilized in the reaction, solvents effective for dissolving the O-esters of tyrosine, or its derivative employed as the starting material, are advantageous. Especially preferred as solvents are water, alcohol (e.g., methanol or ethanol), or mixtures thereof because of their low cost. When water is employed as the solvent, the starting material should be neutralized and dissolved with the use of alkali. As shown in the examples hereinbelow, alkali is not detrimental to the reaction of the present invention, but has a good effect on it, such as an acceleration of the completion of reaction, greater ease of after-treatment, etc.

As catalysts to be used in the hydrogenolysis process may be mentioned, by way of example, platinum, for example, platinum black, palladium, for example, palladium-active carbon, nickel, for example, Raney nickel, etc. These are all catalysts conventionally employed in ordinary catalytic hydrogenation. Any of such catalysts may be used herein. Besides these, cobalt, copper, iron and the like may be employed. Furthermore, these catalysts may be used in combinations of two or more.

Raney nickel is the preferred catalyst in the process of the present invention. Even though the method of the present invention involves the catalytic hydrogenation of sulfur-containing compounds, Raney nickel used as catalyst does not suffer any poisoning which might be anticipated from the known experimental data on the hydrogenolysis of other sulfur-containing compounds, and accelerates the reaction smoothly. However, the nickel ion has a severe poisoning effect on Raney nickel catalyst. Thus, when free sulfonic or sulfuric acid is produced by the hydrogenolysis of the starting material and dissolves the nickel, the reaction does not go to completion. Therefore, the reaction should be conducted in the presence of an excess amount of alkali, i.e., at least, a greater amount of alkali than is equivalent to the ester utilized as the starting material should be employed. For the same reason, when a starting material containing an unesterified α-carboxyl radical is used, the addition of an amount of alkali in excess of the molar equivalent of the starting material has beneficial and advantageous effects.

The amount of catalyst needed in carrying out the reaction according to the process of the present invention varies with the starting material used and the kind of catalyst used. When the hydrogenolysis of an O-tosylate derivative is carried out in the presence of a nickel catalyst (Raney nickel), the reaction is complete within 30 to 60 minutes at room temperatures and atmospheric pressures in the presence of the amount of catalyst of 1 to 2 times as great as the amount of starting compound used. Although, when employing other catalysts, the amount should be increased or decreased according to the activity thereof, generally the greater the amount of catalyst used, the greater will be the speed of reaction. In all cases, tyrosine or the derivative thereof used is readily converted into the desired phenylalanine derivative by the hydrogenolysis reaction of the present invention.

The reaction proceeds smoothly by carrying out the catalytic hydrogenation at room temperature (20°–25° C.) and atmospheric pressure of hydrogen. Of course, the reaction velocity becomes larger by increasing the hydrogen pressure or the reaction temperature. However, when using a starting compound having optical activity, the reaction temperature should not be so high as to cause a possibility of racemization or hydrolysis of the sulfonic or sulfuric acid ester.

The concentration of starting compound varies with the alkali concentration necessary for dissolution of the starting compound or for neutralization of the reaction product. High concentrations of alkali induce the possibility of hydrolysis of the starting compound, the sulfonic or sulfuric acid ester. Therefore, a concentration of alkali of less than 1 N is adequate, and then, a concentration of the starting compound of less than 1 M is favorable to the hydrogenolysis.

After completion of the reaction, the phenylalanine or derivative thereof is obtained in high yield and is readily separated as crystals by filtering off the catalyst, removing any by-product sulfonic acids from the filtrate by extraction; further treatment depends on the type of product obtained. When the product is phenylalanine, it is most suitable to separate the amino acid in pure form by removing the organic solvent from the filtrate, extracting the sulfonic acid in an acidic condition and passing the remaining solution through a column containing a strongly acidic ion exchange resin.

The following examples are given merely as illustrative of the present invention and are not to be considered as limiting.

EXAMPLE 1

34 grams of O-tosyl-L-tyrosine is dissolved in 500 ml. of 2% aqueous caustic soda (sodium hydroxide) solution. 500 ml. of ethanol is added thereto and 40 grams of Raney nickel is suspended therein. The mixture is shaken for 1 hour at room temperature and atmospheric pressure under hydrogen whereby about 2.5 liters of hydrogen is absorbed. The reaction is complete after this amount of time.

The reaction solution is filtered and the Raney nickel separated is washed with 500 ml. of lukewarm water. The colorless solution obtained by putting the filtrate together with the washed solution is adjusted to a pH of 2.0 with concentrated hydrochloric acid and is extracted several times with diethyl ether. Subsequently, p-toluenesulfonic acid is removed therefrom.

The L-phenylalanine produced is absorbed by passing the aqueous phase through a resin column containing 1 liter of a strongly acidic ion exchange resin called Diaion SK#1 (manufactured by the Mitsubishi Kasei Co., Ltd., Japan) (H-form). After the adsorption, the resin column is washed with water, and then 2 N aqueous ammonia is passed through the column for the elution of adsorbed L-phenylalanine. The eluate, showing a positive ninhydrin reaciton, is then concentrated under reduced pressure. The L-phenylalanine is crystallized by cooling. The crystals are separated, and the mother liquor is concentrated and cooled so as to separate the crystals further. Finally, 16 grams of crude crystals is recovered. 15 grams of beautiful crystals of L-phenylalanine is obtained by recrystallization with small amounts of hot water.

Yield=91% of the theoretical amount; melting point=282° C. (decomposition); $[\alpha]_D^{20}=-35.0°$ (c.=2, water).

EXAMPLE 2

This example is conducted in the same manner as the process described in Example 1. Herein, 48 grams of O,N-ditosyl-L-tyrosine is dissolved in 1000 ml. of methanol containing 50 ml. of 20% aqueous caustic soda solution. Then, 10 grams of 30% palladium asbestos is added thereto. The catalytic hydrogenation is carried out for 4 hours.

After the completion of the reaction, the catalyst is filtered off and subsequently the filtrate and the washed solution are put together and concentrated to dryness. The residue is redissolved in 100 ml. of 30% methanol and adjusted to a pH of 2.0 with hydrochloric acid. A crude precipitate having a melting point of about 140° C. is obtained after cooling. By recrystallizing with 3 liters of hot water, 18 grams of N-tosyl-L-phenylalanine is recovered in the form of needle-shaped crystals.

Yield=90% of the theoretical amount; melting point=163° C.; $[\alpha]_D^{20}=-21°$ (c.=2, methanol).

L-phenylalanine is readily obtained by hydrolysis of the product N-tosyl-L-phenylalanine with acid.

EXAMPLE 3

The reaction in this example is conducted similarly as that described in Example 1. 3.8 grams of N-acetyl-O-tosyl-L-tyrosine is dissolved in 100 ml. of methanol. This solution is added to 500 mg. of Adams' platinum catalyst contained in 100 ml. of methanol. Hydrogen is added thereto and the catalytic hydrogenation is carried out for 3 hours.

The catalyst is removed from the reaction solution by filtering after the completion of the reaction. Subsequently, the filtrate is adjusted to a pH of 2.0 with hydrochloric acid and evaporated to dryness under reduced pressure. The residue is washed with ether several times and dissolved in water. 1.6 grams of acetyl-L-phenylalanine having a melting point of 170° C. is recovered by crystallizing with cooling.

Yield=80% of the theoretical amount; $[\alpha]_D^{20}=-39.6°$ (c.=2, methanol).

The same results are obtained when derivatives of the starting compounds or catalysts other than those specifically mentioned in the examples are employed.

The invention being thus described, it will be obvious that the same may be varied in many ways. Such variations are not to be regarded as a departure from the spirit and scope of the invention and all such modifications are intended to be included within the scope of the following claims.

What is claimed is:

1. A process for the preparation of phenylalanine and the N-acyl and ester derivatives of phenylalanine which comprises reacting a solution of a compound selected from the group consisting of the O-arylsulfonic acid esters, O-alkylsulfonic acid esters and O-sulfuric acid esters of tyrosine or the corresponding N-acyl or ester derivatives thereof with hydrogen at a temperature of at least 20° C. in the presence of a hydrogenation catalyst.

2. The process of claim 1, wherein said catalyst is Raney nickel.

3. The process of claim 1, wherein said compound is O-tosyltyrosine.

4. The process of claim 1, wherein said compound is O,N-ditosyltyrosine.

5. A process for the preparation of optically active phenylalanine and N-acyl and ester derivatives of phenylalanine which comprises reacting a solution of a compound selected from the group consisting of the O-arylsulfonic acid esters, O-alkylsulfonic acid esters and O-sulfuric acid esters of optically active tyrosine or the corresponding N-acyl or ester derivatives thereof, said solution containing an excess amount of alkali with respect to the amount of reactant compound, with at least one atmosphere pressure of hydrogen at a temperature of from 20° C. to the boiling point of the solvent used in the presence of a hydrogenation catalyst.

6. The process of claim 5, wherein said catalyst is Raney nickel.

7. The process of claim 5, wherein said compound is O-tosyltyrosine.

8. The process of claim 5, wherein said compound is O,N-ditosyltyrosine.

9. A process for the preparation of L-phenylalanine which comprises reacting a solution of a compound selected from the group consisting of the O-arylsulfonic acid esters, O-alkylsulfonic acid esters and O-sulfuric acid esters of L-tyrosine with hydrogen at a temperature of at least 20° C. in the presence of a hydrogenation catalyst.

10. The process of claim 9, wherein said catalyst is Raney nickel.

11. The process of claim 9, wherein said compound is O-tosyl-L-tyrosine.

12. The process of claim 9, wherein said compound is O,N-ditosyl-L-tyrosine.

13. The process of claim 5, wherein the solvent for the reaction mixture is selected from the group consisting of water, alcohols and mixtures thereof.

14. The process of claim 5, wherein said solution is aqueous and the concentration of alkali therein is less than 1 N.

15. The process of claim 14, wherein said alkali is sodium hydroxide.

References Cited

Chemical Abstracts: vol. 55, by Imaizumi, pp. 5409G and 5410A relied on.

LORRAINE A. WEINBERGER, *Primary Examiner.*

A. THAXTON, *Assistant Examiner.*